United States Patent [19]

Seu

[11] Patent Number: 5,028,899

[45] Date of Patent: Jul. 2, 1991

[54] CLAMP FOR FIXING DEFLECTION YOKE ASSEMBLY

[75] Inventor: Beumchoon Seu, Seoul, Rep. of Korea

[73] Assignee: Samsung Electron Devices Co., Ltd., Rep. of Korea

[21] Appl. No.: 436,827

[22] Filed: Nov. 15, 1989

[30] Foreign Application Priority Data

Dec. 13, 1988 [KR] Rep. of Korea .............. 88-20561[U]

[51] Int. Cl.⁵ .............................................. H01F 7/00
[52] U.S. Cl. .................................... 335/210; 313/421
[58] Field of Search ....................... 335/210, 212, 213; 313/421

[56] References Cited

U.S. PATENT DOCUMENTS

| 3,761,849 | 9/1973 | Van Der Heijde et al. | 335/210 |
| 3,781,730 | 12/1973 | Salners | 335/210 |

FOREIGN PATENT DOCUMENTS

| 2630190 | 2/1977 | Fed. Rep. of Germany | 335/210 |
| 0049727 | 4/1977 | Japan | 335/213 |

*Primary Examiner*—George Harris

[57] ABSTRACT

A clamp comprising a semicircular journal part and an inside diameter changing part disposed to face each other inside a ring-typed band and a fastening bolt that passes through the band perimeter and contacts to the inside diameter changing part by a pad placed at its end.

The fastening force by the fastening bolt in this clamp acts across the neck axis so that it causes no slip movement of the deflection yoke when clamped.

4 Claims, 1 Drawing Sheet

CLAMP FOR FIXING DEFLECTION YOKE ASSEMBLY

FIELD OF THE INVENTION

This invention relates to a clamp which is used for fixing a deflection yoke assembly around the neck of a cathode-ray tube.

The deflection yoke assembly deflects electronic beams in a cathode-ray tube and it has a separator as its frame. At the inner surface of the frame are wound the horizontal deflection coils and at the peripheral surface of the frame vertical deflection coils are wound forming a magnetic field that deflects the electronic beams.

The above mentioned deflection yoke is inserted toward the neck and installed closely to the funnel surface of the cathode-ray tube, and in this case the structure of the means to fix the deflection yoke, as is illustrated in FIG. 2, comprises a clamp C placed at the fixing portion of the deflection yoke D located on the peripheral surface of the yoke N and a bolt for tightening the clamp C along its circumference.

In these types of clamps tightening by the bolt produces a fastening force in the circumferential direction of the yoke. The deflection yoke will readily move around the neck, even such a minute slip movement can cause some misconvergence degrading the picture quality in the cathode-ray tube.

SUMMARY OF THE INVENTION

Accordingly, it is an object of this invention to provide a clamp having a fastening force produced by the bolt acting across the neck axis so that there is no slip movement of the deflection yoke when clamped.

In accordance with this invention, a clamp comprising a semicircular journal part and an inside diameter changing part so disposed to face each other inside the ring-typed band, and a fixing bolt that passes through the band perimeter and contacts on the inside diameter changing part by a pad placed at its end is provided.

Other advantages and features of this invention will be readily understood by the following description with reference to the drawings.

DETAILED DESCRIPTION OF THIS INVENTION

Figure 1:
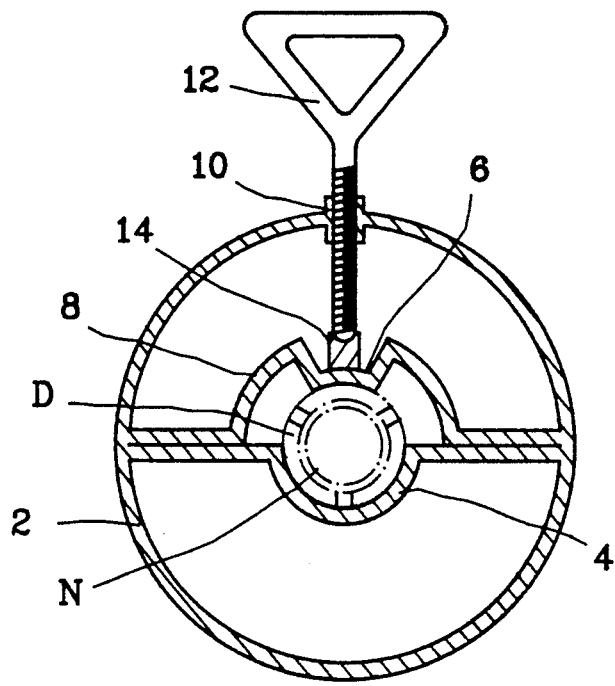
FIG. 1 shows a plane sectional view illustrating the structure of the clamp according to this invention.
Figure 2:
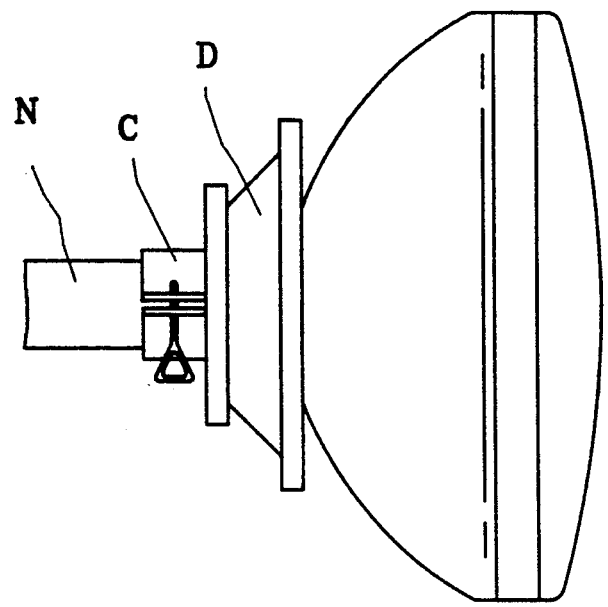
FIG. 2 shows a side view of the cathode-ray tube illustrating the general installation state of the deflection yoke.

In FIG. 1, there is shown a clamp according to this invention which includes a ring-type band 2.

An approximate semicircular journal part 4 and an inside diameter changing part 6 are formed at the inner center of the band 2.

Both sides of the above mentioned inside diameter changing part 6 are supported by circular arms 8 extended from the band 2 providing some elastic restoring force for the inside diameter changing part.

At its upper center, the band perimeter is provided with a boss 10 through which passes a threaded fixing bolt 12 with its direction across the band axis.

The above mentioned fixing bolt 12 make contact on the peripheral surface of the inside diameter changing part 6 by means of a pad 14 placed at its end.

The clamp in the present invention of this structure with the journal part 4 and the inside diameter changing part 6 support the fixing portion of the deflection yoke D which is inserted to the neck N around its perimeter, and the fixing portion of the yoke D will be pressed when the fixing bolt 12 is tightened thus the pad 14 oppressing the inside diameter changing part 6. As the result, the deflection yoke D is securely fixed around the perimeter of the neck N without any slip movement on the neck circumference surface because the fastening force in this case was directed to cross the deflection yoke axis.

Therefore by using the clamp in this invention, the deflection yoke can be accurately installed on the neck, and the deflection yoke can be fixed or released with few adjustments of the fixing bolt because of the smaller contacting area between the deflection yoke and the neck when it is compared with clamps in the prior art hence the readjustment of the deflection yoke becomes easier than ever thus enhancing the productivity.

What is claimed is:

1. A clamp for fixing a deflection yoke assembly around the neck of a cathode-ray tube comprising: a semicircular journal part; an inside diameter changing part so disposed to face the semicircular journal part inside a ring-typed band; a fixing bolt adapted to pass through a band perimeter and to move to a position for contacting and transferring vertical motion from said bolt to the inside diameter changing part by means of a pad placed at the end of the bolt.

2. A clamp according to claim 1 wherein said inside diameter changing part further comprises circular arms extending from the band for supporting both sides of the inside diameter changing part.

3. A clamp according to claim 1 comprising a boss disposed at said band perimeter's upper center through which said fixing bolt passes in the direction of the band's axis, said fixing bolt being adapted to adjust the distance between the boss and the inside diameter changing part.

4. A clamp according to claim 1 wherein there is only one fixing bolt.

* * * * *